Feb. 19, 1924.

F. H. NORTON

1,484,358

WEIGHING APPARATUS

Filed Aug. 29, 1922

Inventor

Frederick H. Norton,

By Allen C. Peck

Attorney

Feb. 19, 1924.

F. H. NORTON

WEIGHING APPARATUS

Filed Aug. 29, 1922

Frederick H. Norton, Inventor

By Allen Peck, Attorney

Feb. 19, 1924. 1,484,358
F. H. NORTON
WEIGHING APPARATUS
Filed Aug. 29. 1922 3 Sheets-Sheet 3

Inventor
Frederick H. Norton,
By Allen Heck
Attorney

Patented Feb. 19, 1924.

1,484,358

UNITED STATES PATENT OFFICE.

FREDERICK H. NORTON, OF LANGLEY FIELD, VIRGINIA.

WEIGHING APPARATUS.

Application filed August 29, 1922. Serial No. 584,990.

*To all whom it may concern:*

Be it known that I, FREDERICK H. NORTON, a citizen of the United States of America, and a resident of Langley Field, Elizabeth City County, Virginia, have invented certain new and useful Improvements in Weighing Apparatus, of which the following is a specification.

This invention relates to certain improvements in weighing apparatus; and the nature and objects of the invention will be readily recognized and understood by those skilled in the arts involved in the light of the following explanation and detailed description of the accompanying drawings illustrating what I at present consider to be be the preferred embodiments or mechanical expressions of the invention from among various other forms, arrangements, combinations and constructions of which the invention is capable within the spirit and scope thereof.

The present invention and the various features thereof are applicable to embodiment in weighing and the like apparatus generally, but are particularly directed and applicable to weighing apparatus of the so-called chemical or precision scale types characterized by the use of a pivoted balance or scale beam, usually although not necessarily of the equal arm type.

As well known and understood by those familiar with this art, in the operation of such types of weighing apparatus in order to secure the required degree of accuracy, the materials to be weighed are supported on or from the scale beam and by the application of unit weights to the beam are as nearly balanced as possible, and, then the beam is brought to equilibrium and the materials exactly balanced by means of a weight, known as a poise or rider, mounted on and movable along the scale beam. Certain serious problems and disadvantages are encountered in the operation and use of such types of weighing apparatus, particularly when it is desired or necessary to weigh materials or objects rapidly and with great accuracy and precision, due to the disturbing forces and moments to which a scale beam is subjected in moving a poise weight or rider therealong to position thereon bringing the scale beam to exact equilibrium. These disturbing forces and moments to which a scale beam is subjected by moving a poise weight or rider therealong, are primarily created as a result of friction during the operation of moving or shifting the poise, particularly friction between the poise and the scale beam upon which supported, and by the position of the poise and the points on the scale beam to which the weight thereof is distributed with respect to the pivotal axis of the beam. Various other contributing causes are likewise present and add to these disturbing forces and moments, depending upon the particular type and mounting of a poise on and with respect to a scale beam, as will be readily apparent to those skilled in this art. The existence of these disturbing forces and moments acting on a scale beam during operation of a poise thereon make it extremely difficult and cause a considerable interval of time to be consumed in bringing a scale beam to exact equilibrium, these conditions being encountered in maximum degree in weighing apparatus of the sensitive and delicate types, such as chemical or analytical scales.

A further disadvantage exists in the chemical or analytical types of scales where rapid and accurate weighing is required, in that the range of weights possible with the use of a poise weight or rider is comparatively small, and when the weights of materials or objects to be weighed are beyond the poise or rider range, it is necessary to employ unit weights as hereinbefore pointed out. With the use of unit weights errors are easily made and of frequent occurrence in computing the total weight by adding the unit weights and the weight indicated by the poise or rider position on a scale beam.

Therefore, one of the primary and main objects of the present invention is to overcome and substantially eliminate, in weighing apparatus of the type including a pivoted scale beam and a rider or poise movable therealong, the problem of disturbing forces and moments to which a scale beam is subjected by the movement of a poise weight or rider therealong in bringing the scale beam to equilibrium, and to thereby permit of weighing on and by such types of weighing apparatus with greater rapidity and a higher degree of accuracy and precision.

A further object of the invention is to increase the weight range of a poise or rider in weighing apparatus of the chemical or analytical scale type having a pivoted scale beam and a poise or rider movable therealong, so that the necessity of using unit weights in conjunction and co-operation with the poise or rider will be materially reduced, and practically eliminated for the average weighing operations for which such types are utilized.

A further object of the invention is to provide weighing apparatus of the type having a pivoted balance or scale beam and a poise or rider movable therealong, in which the construction of the poise and the mounting thereof together with the operating mechanism for moving the same along the scale beam is such that friction is practically eliminated between the scale beam and poise during movement of the latter along the beam; no vertical loads are transmitted to the scale beam other than the weight of the poise; and the weight of the poise is transmitted to the scale beam at such points with respect to the pivotal axis of the beam that the poise can be moved or shifted along the beam without creating and introducing disturbing moments and forces to the beam tending to rotate the same on its axis.

A further object of the invention is to overcome and eliminate in weighing apparatus the effects of changes in temperature resulting in unequal expansion and contraction of elements thereof, and causing variations and errors in the readings obtained from weighing operations.

A further object of the invention is to provide mechanism for automatically actuating a poise weight or rider on and along a scale beam to bring the beam to exact balance or equilibrium.

A further object of the invention is to provide mechanism including a motor for automatically actuating a poise weight or rider on and along a scale beam of weighing apparatus to bring the scale beam to exact balance or equilibrium in performing weighing operations, and which mechanism is controlled by the movements of the scale beam about its axis, in such a manner that as the beam nears equilibrium the speed of the motor actuating the poise weight is reduced so as to decrease the magnitude of the poise oscillations at the balance point, and to prevent over-running of the poise.

A further object of the invention is to provide weighing apparatus of the type including a pivoted balance or scale beam and a poise weight or rider mounted for movement thereon and therealong, with improved mechanism for computing and indicating the effective weight applied to the scale beam by the poise from the position of the poise on the beam with the latter in equilibrium.

With the foregoing and various other objects in view, which other objects will be readily recognized and appreciated by those skilled in the art, the invention consists in certain novel features in construction and in combinations and arrangements of parts as more fully and particularly set forth and specified hereinafter.

Referring to the accompanying drawings.

The various weighing apparatus problems to the solution and elimination of which the present invention is directed, as hereinbefore referred to, are encountered in exaggerated form and present the greatest difficulties and disadvantages in the operation and use of weighing apparatus of the sensitive and delicate types, such as chemical or analytical scales utilized for weighing operations requiring a high degree of accuracy and precision. Hence, in the accompanying drawings the various features of the invention are illustrated as applied to and embodied in weighing apparatus of the chemical or analytical type, purely by way of an example to more clearly bring out and illustrate the objects and results of the invention. It is to be understood, as will be apparent to those familiar with this art, that the various features of the invention are not limited to embodiment in the illustrated types, but are equally applicable to weighing apparatus generally in which similar or equivalent problems are encountered or in which it is desired to attain the objects and results of the present invention.

Figure 1:
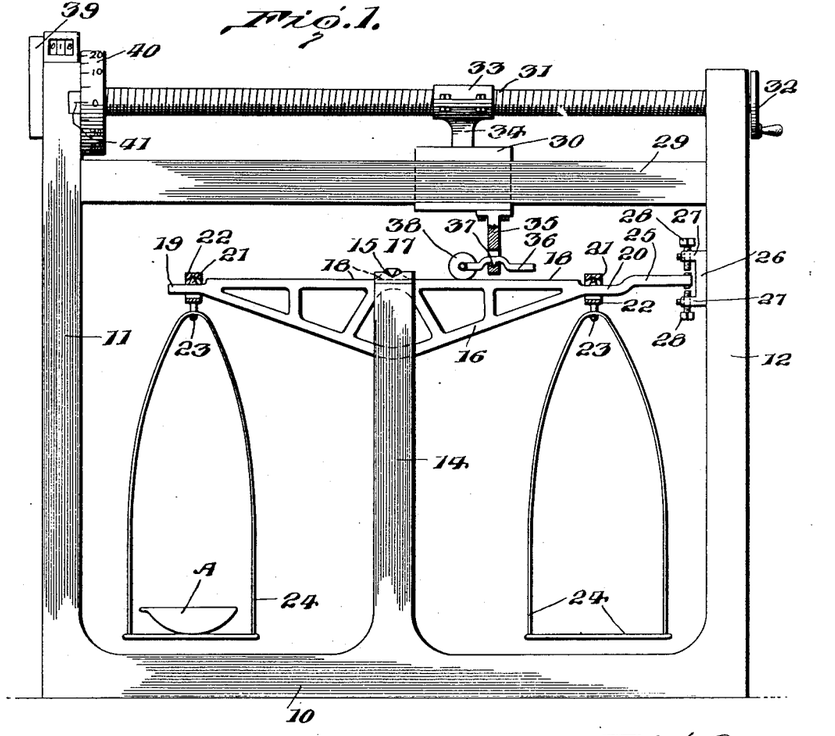
Fig. 1, is a view in side elevation of weighing apparatus of the chemical or analytical scale type embodying the scale beam and poise construction and mounting features of the invention, together with the effective poise weight computing mechanism of the invention, the scale illustrated being of the manually operated type.

In Fig. 1 of the accompanying drawings a chemical or analytical scale is illustrated of the manually operated type in which certain features of the instant invention are operatively incorporated. The illustrated scale or balance comprises any suitable or desired frame including a base 10 and upright vertically disposed frame side members 11 and 12. Vertically disposed and spaced standards 14 are mounted on and extend vertically from the base 10 intermediate the frame side members 10 and 11, one only of said standards 14 being seen in the side elevation of Fig. 1. The upper free ends of the standards 14 are formed or provided with V, or similarly shaped notches 15 extending transversely across and in alinement with each other, and a balance or scale beam 16 is pivotally mounted on and extending horizontally between said standards by means of suitable alined knife edges 17 extending laterally from opposite sides of the scale beam 16 and seated in the depressions or notches 15 of the standards 14. The scale beam 16 is formed with a straight horizontally disposed flat top or upper edge face providing a runway or track 18, and it will be particularly noted in this connection that the beam knife edges 17 extend laterally from the beam above the upper edge thereof with their edges terminating in a horizontal plane substantially coincident with, or preferably as in the specific example illustrated a distance above, the horizontal plane of the track 18 formed on or by the upper edge of the scale beam. The track 18 extends between and uninterrupted by the knife edges 17 and forms a continuous, unbroken surface along the major portion of the length of the beam intermediate the ends thereof.

The horizontally disposed scale beam 16 pivotally mounted intermediate the ends thereof in the manner above described, terminates in the present instance in the reduced end lengths 19 and 20 located below the horizontal plane of the scale beam track 18. Each of the reduced end lengths 19 and 20 of the scale beam 16 is provided with a knife edge 21 on and extending upwardly from and transversely of the beam. A ring or collar 22 is placed over and loosely around each reduced end portion of the scale beam 16 and is pivotally mounted on and supported from the knife edge 21 thereof. The rings or collars 22 are provided with suitable hooks or eyes 23 on the lower or under sides thereof and a scale pan 24 is suspended and pivotally depends from each collar eye 24 at the opposite free ends, respectively, of the scale beam 16.

The reduced free end 20 of the scale beam 16 is extended in a plane thereabove, in the specific example illustrated, and forms an arm 25 integral with and in substantial longitudinal and horizontal continuation of the scale beam. The arm 25 of the scale beam 16 terminates adjacent the scale frame side member 12, and a block or the like 26 provided with spaced, horizontally disposed projecting lugs 27 is mounted on and extending inwardly from the frame side member 12 in line with the scale beam 16 and arm 25 thereof, and with the arm 25 extending and terminating between the spaced lugs 27 of the block 26. The lugs 27 are provided with the alined transversely disposed and adjustable stop screws 28 between which the scale beam arm 26 extends and by which the movement of the scale beam around the main knife edges 17 is limited. The foregoing construction and arrangement is such that with the scale beam 16 in equilibrium the arm 25 thereof floats between and out of contact with the stop screws 28. A suitable pointer, or other indicating means, (not shown) may be mounted on the arm 25 for indicating by alinement with a point on a fixed index (not shown) when the scale beam is in exact equilibrium, as well known and understood in this art.

A guide bar 29 is horizontally mounted between the frame side members 11 and 12, above and in vertical alinement with pivotally mounted scale beam 16, and a carriage 30 is slidably mounted on and supported by the guide bar 29 for longitudinal movement therealong. A lead screw is rotatably mounted in horizontal position between the frame side members 11 and 12, above and parallel with the guide bar 29. In the instant example, the lead screw 31 is journaled in the frame side members 11 and 12, and extends through and beyond the side member 12 where it is provided with a disk and crank handle 32 by means of which the lead screw is manually rotatable. An internally threaded sleeve 33 is mounted on the lead screw 31 in operative engagement with the threads thereof, and the sleeve 33 is rigidly connected with the sliding carriage 30 by an arm 34 from the carriage to the sleeve. Thus, by rotating the lead screw 31 the sleeve 33 is forced longitudinally therealong in a direction depending upon the direction of rotation of the lead screw, and through the arm 34 rigidly connecting the carriage 30 with the sleeve. the carriage is moved longitudinally on the guide rod 29.

The invention provides a peculiar construction and mounting of a poise weight for movement along the pivoted scale beam 16 by the carriage 30 and lead screw 31. An arm 35 is fixed to and depends from the carriage 30 directly above and in line with the pivoted scale beam 16. The arm 35 terminates a distance above the track 18 formed on the upper edge of the beam, and is provided with a transverse bore or opening therethrough formed with a depression or seat in the lower inner face thereof. A lever 36 having an offset portion provided with a knife edge 37 is pivotally mounted on the arm 35 and extending horizontally through the opening formed in the lower end thereof, with the lever knife edge 37 seated in the depression provided in the arm 35 and confining the lever 36 in position on the arm. The lever 36 extends in substantially horizontally disposed position directly above the scale beam 16 and balanced on the knife edge 37. A roller poise weight is rotatably mounted and connected on the inner free end of the lever 36, and is supported upon and in contact with the track 18 of the scale beam 16. The roller poise 38 is rotatably mounted on the lever 36 by means of any suitable horizontally disposed axis transversely of the lever 36, such as an axle, pivot pins or the like.

The construction and mounting of the lever 36 and roller poise 38 is such that the lever 36 is balanced on the knife edge 37 resting on the arm 35, and the roller poise rests upon and is supported on the scale beam 16 without the transmission of vertical loads from the lever 36 to the roller poise 38 or its pivotal mounting, with the result that friction between the lever 36 and the roller poise is practically eliminated and the weight of the poise alone is transmitted to the scale beam. The position of the track 18 formed on the upper edge of the scale beam 16 in a horizontal plane slightly below the pivotal axis of the beam formed by the main knife edges 17, and the transmission of the roller poise weight to the scale beam along the track 18 reduces the disturbing forces or moments about the axis of the scale beam due to the friction between the roller poise 38 and the scale beam track 18, and to any possible friction in the poise mounting on the lever 36, during rolling movement of the poise on the track 18 along the scale beam, to zero.

From the foregoing it will be clear that by rotation of the lead screw 31 by the disk and handle 32, the carriage 30 is moved along the guide rod 29 and the poise weight 38 is rolled along the scale beam 16 on the track 18 in the desired direction, toward or from the scale beam axis, as determined by the direction of rotation of the lead screw 31. The weight of the roller poise 38 is known, and the effective weight applied to the scale beam 16 by the poise is proportional to the position of the poise thereon and its horizontal distance from the main pivotal axis of the scale beam.

Counting or computing mechanism is provided for indicating the effective weight applied to the scale beam 16 by the poise 38, from the position of the poise on the scale beam. A revolution counter 39 is mounted on the frame side member 11, or in any other suitable or desired position, and is operatively connected with and actuated by the lead screw 31 to indicate the revolutions thereof. An index head 40 is mounted on the lead screw 31 adjacent the frame side member 11 which bears a fixed point or line 41 for co-operation with an index formed on and around the peripheral edge of the index head 40. The index head 40 is arranged and provided with a suitable index for indicating fractions of a revolution of the lead screw 31. Preferably, the revolution counter 39 and index head 40, are calibrated to indicate the effective weight applied to the scale beam 16 by the poise 38, by arranging the numerals or indicia of the revolution counter to indicate the weight equivalent to each revolution of the lead screw and resulting position of the poise 38 on the beam 16, and by arranging the indicia on the index head to indicate the weight equivalent to fractions of a revolution of the lead screw and resulting position of the poise on the scale beam.

It will be clear from the foregoing description and explanation that the position of the roller poise 38 on the scale beam 16 and its distance from the axis of the beam must be known and indicated exactly to secure the desired precision and accuracy in weighing. If there is unequal expansion or contraction in the lead screw and the beam, and in and between the members or elements longitudinally holding the lead screw and connecting to the main knife edge forming the pivotal axis of the beam, due to changes in temperature, then appreciable errors will result in the readings and weights determined from weighing operations. Such unequal expansion and contraction is overcome in the invention by forming such members thereof from materials having the same coefficient of expansion, with the result that, for example, a certain rise in temperature will increase the distance between the main knife edge of the beam and the objects or materials being weighed by the same fraction that it will increase the distance between the main knife edge and the roller poise on the scale beam, thus not affecting the accuracy or precision of the readings and results obtained from weighing operations. It follows, of course, that a certain decrease in temperature will result in an equal contraction throughout the above mentioned members, so that by the foregoing provision of the invention the accuracy of the results obtained is maintained under all conditions of temperature.

In performing weighing operations with the described type of chemical or analytical scale embodying the referred to features of the invention, the object or materials to be weighed, such as A, are placed in the scale pan 24 suspended from the end 19 of the scale beam, and the roller poise 38 is shifted or moved along the scale beam 16 on the track 18, by manually rotating the lead screw 31 in the proper direction until the scale beam is brought to exact equilibrium with the weight of the poise 38 applied to the scale beam at such a distance from the pivotal axis of the beam as to counterbalance the weight of the object A. The weight of the object A is then determined by reading the indications given by the revolution counter 39 and index head 40, as will be readily understood. It is to be noted that in bringing the beam 16 to equilibrium with the arm 25 thereof floating between and out of contact with the stop screws 28, by means of manual rotation of the lead screw 31, the roller poise is moved along the track 18 with the creation of substantially no disturbing forces or moments in the scale beam tending to rotate the same on its pivotal axis. This result is obtained due to the hereinbefore described construction and mounting of the poise 38 with the shifting mechanism therefor supported independently of the scale beam in such a manner that no vertical loads are transmitted therefrom to the beam or to the roller poise 38. With the scale construction described it is possible to very rapidly bring the scale beam to equilibrium because of the elimination of disturbing forces from the movement of the poise weight thereon and permits of an accurate and precise weighing of objects and materials.

In the event that the weight of the objects or materials to be weighed exceeds the range of the poise weight, as determined by its extreme outward position on the beam from the pivotal axis thereof, then unit weights can be employed and placed in the scale pan 24 suspended from the arm of the scale beam upon which the poise weight is supported. However, by the construction and arrangement of the invention it is possible to provide a poise of sufficient weight to care for the average weighing operations for which scales of the chemical or analytical type are utilized, and without defeating or reducing the results obtained in rapid balancing and accurate weighing.

Figure 5:
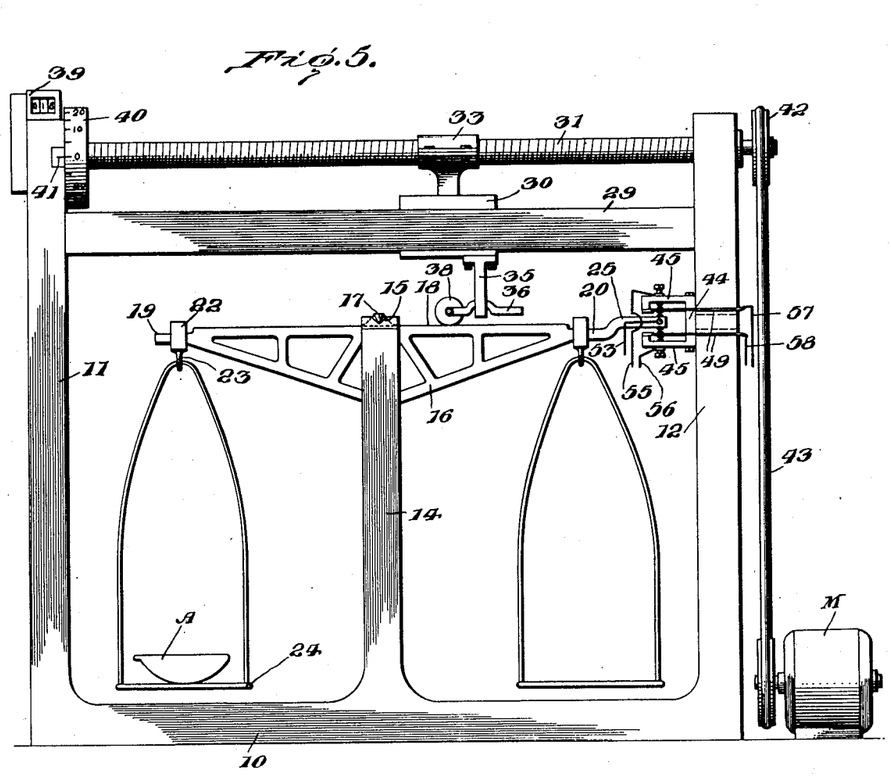
Fig. 5, is a view in side elevation of weighing apparatus of the chemical or analytical scale type embodying the scale beam and poise construction and mounting of the invention; and showing the construction and arrangement of the invention for automatically actuating the poise by means of an electric motor.
Figure 6:
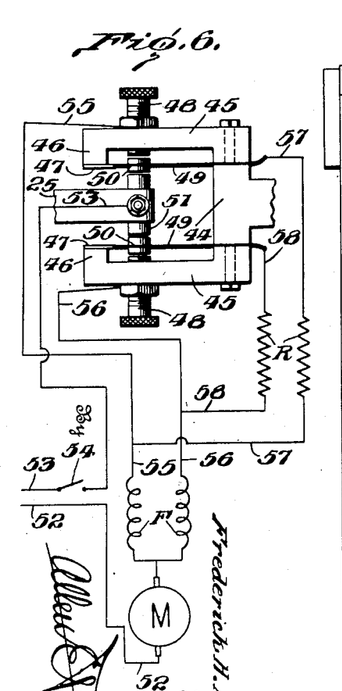
Fig. 6, is a view, more or less diagrammatical, of the automatic poise actuating mechanism and the arrangement of the electric motor and controlling circuits therefor.

The instant invention contemplates and includes automatic operating mechanism for performing weighing operations on and with the weighing apparatus embodying the hereinbefore described features of the invention. One form and mechanical adaptation of automatic operating mechanism is illustrated in Figs. 5 and 6 of the accompanying drawings. A motor M, of the reversible type (see Fig. 5) is suitably mounted, in the example shown, adjacent the base end of the frame side member 12. The lead screw 31 is provided with the pulley 42 and is operatively connected with the motor M by means of any suitable driving connection, such as the belt 43 between the motor M and pulley 42, so that operation of the motor M in either direction will result in rotation of the lead screw 31. It will be understood, of course, that any suitable or desired type of motor can be utilized and that any suitable driving connections can be employed between and connecting the lead screw for rotation by the motor. The motor M so mounted and operatively connected with the lead screw 31, is controlled by the movements of the scale beam 16 about its main pivotal axis in the following manner.

A block or supporting member 44 is suitably mounted on and attached to the frame side member 12 in line with the free end 25 of the scale beam 16, and spaced horizontally disposed arms 45 are secured to the upper and lower sides of the block 44. The arms 45 extend inwardly from the block 44 with the end of the scale beam 16 extending therebetween. The arms 45 terminate at their inner free ends in the portions 46 extending laterally therefrom, inwardly toward each other and spaced a distance apart with the free end of the scale beam 16 extending therebetween. Heads or plates 47 are provided on the ends of the projections 46 and project laterally therefrom in a direction toward the base member or block 44, see particularly Fig. 6 of the drawings. Each arm 45 is provided with an adjustable vertically disposed contact screw 48 extending transversely therethrough and terminating a distance from the end of the adjacent arm projection 46. Spring arms 49 are in the instant example secured in and extending through the frame side member 12 and spaced apart by the base block 44. The spring arms 49 extend inwardly to the projections 46 of the arms 45, with their ends normally resting upon the laterally projecting plates 47. The spring arms 49 are provided with suitable contacts 50 on opposite sides thereof in line with the alined contact screws 48, and the free end 25 of the scale beam 16 which projects between the arms 45 and spring plates 49, is formed with the opposite, alined contacts 51, in line with the contact screws 48 in the arms 45. Thus, with the scale beam in equilibrium the free end 25 thereof will float between and out of contact with the spring arms 49. Upon positive or negative rotation of the scale beam 16 about its main pivotal axis in coming to equilibrium, the free end 25 thereof will alternately engage each of the spring arms 49 with the contact 51 of the scale beam in engagement with the adjacent spring arm contact 50, respectively. If the movement of the scale beam is sufficiently extended, as at the commencement of operations to bring the beam to equilibrium, the free end 25 of the beam in engaging the spring arms 49 will alternately force these respective arms from normal position, outwardly into engagement with the respective contact screws 48, with the spring arm contacts 50 in engagement alternately with the respective contact screws. Then as the movements of the scale beam decrease in extent upon approach of the beam to equilibrium the force thereof will diminish and be insufficient to overcome the tension of the spring arms 49, which will be engaged by the free end 25 of the beam but will remain in normal position resting on the plates 47.

The above described arrangement and mounting of the various fixed and movable contacts engaged by the scale beam during positive and negative rotation of the beam in coming to equilibrium, are operatively connected with the motor M which is controlled thereby to rotate the lead screw 31 and actuate the roller poise 38 to bring the scale beam to equilibrium. In Fig. 6 of the drawings the electrical circuits connecting the motor M to the scale beam engaged contacts and by which the motor is controlled are diagrammatically disclosed. A power circuit comprising the supply wires 52 and 53 leading from any suitable or desired source of electrical current (not shown), has the wire 52 of the circuit connected to one pole of the motor M, and the wire 53 extending to and electrically connected with the arm 25 of the scale beam 16. Any suitable switch 54 is interposed in the wire 53 for opening and closing the power circuit. At this point attention is called to the fact that the wire 53 is so connected to and arranged with respect to the free end 25 of the scale beam that it in no way interferes with the freedom of movement of the beam or otherwise affects the condition of the scale beam in operation.

The motor M is of the reversible type, as diagrammatically indicated in Fig. 6 by the oppositely wound fields F thereof, and as will be clear and understood by those familiar with the motor art. One field F is connected by a wire 55 with what is hereinafter referred to as the upper of the contact screws 48, and the other field F is connected with what is hereinafter referred to as the lower of the contact screws 48, by a wire 56. The upper spring arm 49 is connected with the wire 55 of the upper contact screw 48, by a wire 57, and the lower spring arm 49 is connected by a wire 58 with the wire 56 leading from a motor field F to the lower contact screw 48. Each of the wires 57 and 58 leading from the spring arms 49 to the motor M, is provided with suitable resistance R interposed and connected therein and therewith. It will be clear from the above that when the scale beam arm 25 moves upwardly with sufficient force to swing the upper spring arm 49 from normal position into engagement with the contact screw 48, that a circuit is closed to the motor through wire 53, arm 25, contact 51, spring arm contact 50, contact screw 48, wire 55 to motor M, and from motor M back to supply by wire 52; and that when the scale beam arm moves downwardly and swings the lower spring arm 49 from normal position into engagement with the lower contact screw 48, a circuit is closed to the motor through wire 53, scale beam arm 25, lower contact 51, spring arm contact 50, lower contact screw 48, wire 56 to motor M, and through motor M and back to supply by wire 52. Upon closing of the above circuits it will also be seen that circuits are closed through the spring arms 49, on upward movement of the scale beam from arm 25 thereof, through upper spring arm 49, wire 57, resistance R, motor M and back to supply by wire 52; and on downward movement of the scale beam from arm 25 thereof, lower spring arm 49, wire 58 and the resistance R thereinto motor M, and back to supply from motor M by wire 52. However, when the circuits through contact screws 48 are closed by the extended movements of the scale beam 16, the current takes the path of least resistance and flows to the motor by the circuits through the contact screws 48, instead of through the spring arm 49 circuits which include the resistance R, as will be readily apparent upon reference to Fig. 6 of the drawings. When the scale beam movements are not sufficient to force the spring contacts 49 into engagements with the screw contacts 48 and close the circuits through the same, then current flows to and operates the motor through the resistance circuits from the spring contact arms, with the result that the current is reduced by the resistance and the motor operated at slow or reduced speed.

The circuits above described are so connected with the motor and the fields F thereof, that when the circuits to the motor are closed by upward movement of the scale beam 16 the motor is operated in a direction to rotate the lead screw 31 to move the poise outwardly on the scale beam and force the latter downwardly; and when the motor circuits are closed by downward rotation of the scale beam the motor is operated to move the poise 38 inwardly on the scale beam. In connection with the diagrammatical illustration in Fig. 6, of the circuits and contacts forming the means operated by the scale beam for controlling the motor, it is not deemed necessary to explain the manner of insulating the various circuits and elements connected thereby, as it is understood of course that suitable insulating means is provided for maintaining the various circuits and contacts electrically operative.

The operation of the automatically operated form of the invention exemplified by the type illustrated in Figs. 5 and 6, will be clear from the foregoing detailed description. The objects or materials to be weighed, A, are placed in the scale pan 24 suspended from the end 19 of the scale beam 16, and the switch 54 of the supply line to the motor circuits is closed. Upon closure of the switch 54, the automatic operation of the poise shifting mechanism sets in, the positive and negative rotation of the scale beam 16 around its main pivotal axis causing operation of the motor in the proper direction, by opening and closing the various motor circuits in a manner hereinbefore explained, to rotate the lead screw 31 and shift the roller poise 38 in the proper directions along the scale beam to bring the beam to equilibrium and exactly balance the objects or materials being weighed. When the scale beam reaches equilibrium it may float between and out of contact with the motor circuits thereby opening these circuits and causing the motor M to remain stationary and inoperative, or the scale beam under certain conditions may constantly oscillate between the contacts and cause the motor M to continually make small excursions in first one direction and then in the opposite direction. The provision of the double contacts and circuits, one set of which is formed with the resistance R included therein and connected and arranged in the relation as described, results in decreasing the speed of the motor and of the shifting of the poise on the scale beam as the beam nears equilibrium, thus overcoming over running of the poise and reducing the magnitude of the poise oscillations at the balance point. It will be apparent that relays may be used in the motor circuits in place of a direct connection as illustrated, and that the number of motor circuits controlled by the scale beam can be increased and include varying degrees of resistance to step the motor speed downwardly as the movements of the scale beam decrease in approaching equilibrium.

Experience has shown that with the automatic operation of the scale poise by the motor controlled by the movements of the scale beam to open and close the motor circuits, the use of fixed contacts decreased the precision of the balance due to possibility of their sticking or burning during operation. Further, in order to eliminate the effects of wear between the contacts and of the expansion created on the arm of the scale beam carrying the contacts, due to heating of the contacts, it was found that by mounting the contacts on an arm extending centrally from the beam in line with and laterally from the main pivotal axis of the beam, the accuracy and precision of a scale was materially increased. An embodiment of the invention presenting the above features is more or less diagrammatically disclosed in Fig. 7 of the accompanying drawings, in which form of the invention a depending central contact carrying arm is mounted for co-operation with revolving contacts.

Figure 7:
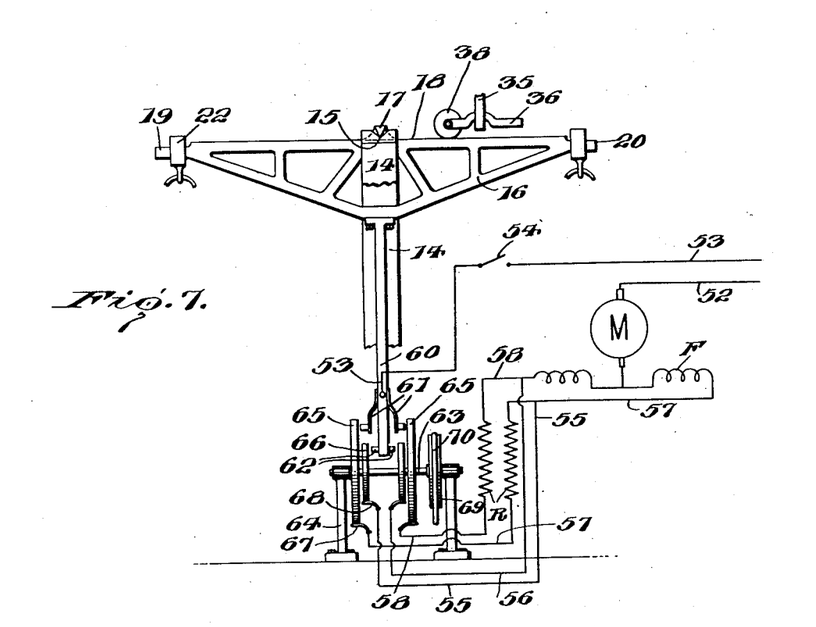
Fig. 7, is a view, more or less diagrammatical, of another form of the automatic poise actuating mechanism of the invention in which a contact arm is provided in operative relation with revolving contact disks, the motor and controlling circuits therefor being diagrammatically shown in operative connection therewith.

The scale beam 16 is provided with the central depending arm 60, bolted or otherwise suitably secured to the scale beam directly below and in the vertical plane of the knife edges 17 forming the main pivotal axis of the scale beam. The lower free end of the arm 60 is provided with a pair of spring contact arms 61 extending from opposite sides thereof, respectively, and spaced from the arm. Another pair of fixed contacts 62 are mounted on opposite sides of the arm 60, and in the present instance a distance below the spring contacts 62. A shaft 63 is suitably mounted extending below and disposed transversely across and spaced from the lower free end of the arm 60, the shaft 63 being rotatably journaled in any suitable standards or the like 64. A pair of disks 65 are fixed to the shaft 63 for rotation therewith, and are mounted on the shaft so that the end of the arm 60 depends therebetween. The disks 65 are spaced a sufficient distance apart, so that with the beam 16 in equilibrium and the arm 60 exactly vertical the spring contacts 61 are out of engagement with the said disks. A second pair of disks 66 are fixed on the shaft 63 between the outer disks 65 and spaced apart so that the end of arm 60 depends therebetween with the fixed contacts 62 out of engagement therewith. Brushes 67 are mounted in electrical engagement with the disks 65, respectively, and the disks 66 are provided with the brushes 68 in electrical contact therewith. A pulley 69, or any other suitable driving element is mounted on the shaft 63 and is driven by a belt 70 or the like from any desired source of power (not shown) to rotate shaft 63 and the disks mounted thereon.

The motor M and its controlling circuits are diagrammatically shown in electrical connection with the revolving disks and contacts of shafts 63 and 60, these circuits being substantially the same as disclosed and described hereinbefore with respect to the embodiment of Figs. 5 and 6. The wires 57 and 58 of the motor circuits including the resistance R, are connected in the proper relation to the brushes 68 in contact with the rotating disks 66; and the wires 55 and 56 of the open motor circuits are connected in the proper relation to the brushes 67, respectively, in contact with the rotating disks 65.

The operation of the embodiment of Fig. 7 is similar to that described with reference to Figs. 5 and 6. As the scale beam rotates in a positive and negative direction in coming to equilibrium, the arm 60 is oscillated between the disks on the shaft 63, which are rotated by any suitable means during weighing operations, and the contacts 61 and 62 alternately engage opposite disks of the pairs of rotating disks. During extended oscillations of the arm 60 the tension of spring contacts 61 is overcome and permits engagement of disks 66 connected to circuits including wires 55 and 56 with the fixed contacts 62 of arm 60; and as the beam approaches equilibrium and the extent of the arm oscillations is decreased, the spring contacts 61 only contact with disks 65 which are connected with the reduced speed or resistance circuits formed by wires 57 and 58. It is understood of course that the motor circuits are so arranged that the required direction of rotation of the motor results to shift the poise 38 in the proper direction to counteract the direction of rotation of the scale beam. It is further pointed out that suitable insulation for the rotating disks and contacts engaged thereby is provided, as will be clear to those skilled in the art involved. By the rotating disks engaging the arm contacts it will be apparent that sticking or burning of the contacts is avoided while by the use of the depending centrally disposed arm 60 on the scale beam the effects from contact wear and heating at one end of the scale beam is eliminated.

Figures 8, 9:
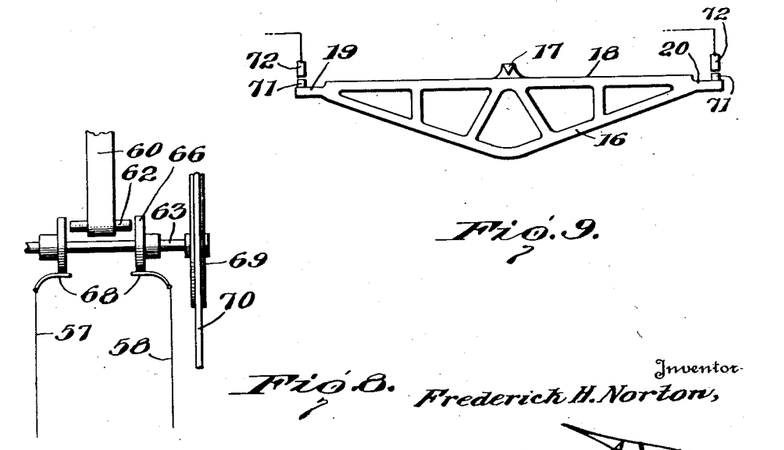
Fig. 8, is a detail diagrammatic view of another form of contact arm and rotary contact disks in operative relation thereto, in which form a pair of contacts and two controlling circuits only are provided for operating the motor.
Fig. 9, is a view in side elevation of a modified mounting of the motor circuit controlling contacts on a scale or balance beam.

In Fig. 8, a form and arrangement of rotating contacts is shown for use with the arm 60, in which a single pair of contacts 62 and a single pair of disks 66 are employed, the spring contacts 61 and disks 65 with their circuits being eliminated.

Another arrangement of contacts to eliminate heating and wear at one end only of the scale beam is illustrated in Fig. 9. In this form of the invention contacts 71 are fixed on opposite ends of a scale beam 16, and alternately engage contacts 72 during positive and negative rotation of the scale beam to open and close motor circuits in a manner similar to that described hereinbefore with respect to the other forms of automatically operated scales.

Figures 2, 3, 4:
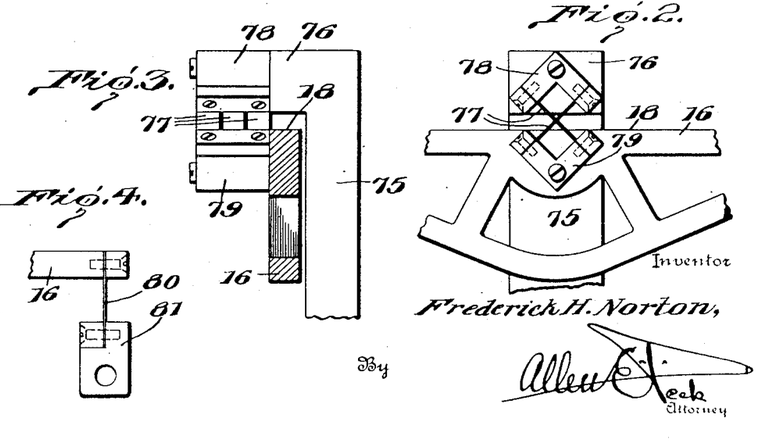
Fig. 2, is a view in side elevation of a modified form of pivotal mounting for a scale beam, a portion of the scale beam and supporting standard therefor being shown.
Fig. 3, is a view in edge or end elevation of the scale beam mounting of Fig. 2, the scale beam being shown in transverse vertical section.
Fig. 4, is a detail view in side elevation of a modified form of pivotal mounting for suspending a scale pan from a scale beam.

A modified form of pivotal mounting for a scale beam is illustrated in Figs. 2 and 3, in which an arrangement of flexible plates is employed in place of the usual knife edge mounting. In the example shown a supporting standard 75 having a laterally projecting head 76 is provided. A scale beam 16 of the equal arm type is pivotally suspended from the head 76 by means of crossed flexible plates or strips 77 suitably attached at their ends in a clamping block 78 secured on the head 76, and a clamping block 79 secured on the scale beam, respectively. The flexible plates 77 are arranged to cross and form a pivotal mounting, the axis of which is above the track 18 for a movable poise to secure the results and advantages as hereinbefore fully explained. The plates 77 are flexible and permit rotation of the scale beam by the deflection or bending of the plates as will be clear from the drawings.

In Fig. 4, a pivotal suspension for a scale pan from a scale beam is shown, in which a thin flexible plate 80 is secured to the scale beam 16 and has a scale pan attaching member 81 mounted on the free end thereof.

By the various features of the invention described in connection with the forms illustrated as examples of mechanical adaptations from among various others of which they are capable, it will be clear to those skilled in this art, that certain indicated problems and disadvantages in weighing apparatus are overcome, and that by the invention it is possible to provide weighing apparatus of a high degree of accuracy and precision capable of performing weighing operations with great rapidity.

It is evident that various changes, variations, modifications and substitutions might be resorted to without departing from the spirit and scope of the invention, and hence I do not desire to limit the invention to the exact disclosures hereof.

Desiring to protect my invention in the broadest manner legally possible, what I claim is:

1. In weighing apparatus, a pivotally mounted scale beam, a roller poise continuously supported on said beam for rolling longitudinally thereon, means supported independently of said scale beam for movement longitudinally thereof, and means connecting said poise with the said movable means without the transmission of vertical loads therefrom to the poise, the said poise adapted to be rolled longitudinally of the scale beam by said movable means.

2. In weighing apparatus, a scale beam, an arm supported independently and movable longitudinal thereof, a lever balanced on said arm, and a roller poise rotatably mounted on said balanced lever and continuously supported on said scale beam for rolling movement therealong, the said lever so balanced that no vertical loads are transmitted therefrom to said poise.

3. In weighing apparatus, a pivotally mounted scale beam having a longitudinally extending track thereon the plane of which is below the horizontal plane of the axis of said beam, a roller poise continuously supported on said beam track and transmitting its weight to said beam in the plane of said beam track, and means supported independently of said scale beam and engaging said roller poise without the transmission of vertical loads thereto, the said means adapted to shift said poise on the beam by rolling the same along said beam track.

4. In weighing apparatus, a horizontally disposed pivotally mounted scale beam, a cylindrical poise weight continuously supported on said beam for rolling therealong, means for rolling the poise weight along the beam without introducing moments to the beam other than those due to the weight of the poise, and means for indicating the moment produced by the poise weight about the main pivotal axis of the scale beam.

5. In weighing apparatus including a pivoted scale beam, and a roller poise supported by said beam for rolling therealong, means for rolling said poise along the scale beam, comprising a carriage supported and movable independently of and along said scale beam, a horizontally disposed lever approximately balanced about its center on pivots on said carriage, the said poise rotatably mounted on pivots at one end of said balanced lever, and the said poise resting on and movable along a track formed on said scale beam at such a height in relation to the pivotal axis of the scale beam that the moments due to the rolling and pivot friction of the roller poise are zero about the pivotal axis of the said scale beam.

6. In weighing apparatus, a pivotally mounted scale beam, a poise weight supported and movable along said scale beam, means for shifting said poise along the scale beam, an electric motor operatively connected with said poise shifting means, controlling circuits for said motor including rotatable contacts therein, and contacts actuated by the movements of said scale beam for engagement and disengagement with said rotatable contacts to open and close said motor controlling circuits.

7. In weighing apparatus, a pivotally mounted scale beam, a poise weight supported on and movable along said scale beam, means for shifting said poise along the scale beam, a reversible motor operatively connected with said poise shifting means, a normally open controlling circuit for rotating said motor in one direction and a normally open controlling circuit for rotating said motor in the reverse direction, a rotatable contact connected with each of said circuits, and said scale beam provided with and actuating contacts adapted to alternately engage the rotatable contacts of said circuits, respectively, upon positive and negative rotation of the scale beam to cause the rotation of said motor in the proper direction to shift said poise and bring the said scale beam to equilibrium.

8. In weighing apparatus, a pivotally mounted scale beam, a poise weight supported on and movable along said scale beam, means for shifting said poise on and along said scale beam, a reversible motor operatively connected with said poise shifting means for actuating the same to shift said poise in either direction longitudinally of the scale beam, a plurality of normally open circuits for rotating said motor in the reverse direction, each of said plurality of circuits including a resistance circuit for operating said motor at reduced speed, rotatable contacts connected in each of said circuits, and fixed contacts connected in said circuits and actuated by the positive and negative rotation of said scale beam to alternately engage said rotatable contacts, in each plurality of circuits, respectively, to cause rotation of said motor to shift said poise in the proper directions to bring said scale beam to equilibrium, the said resistance circuits only being closed upon decrease in the movements of the scale beam as it approaches equilibrium to cause a decrease in the rate of speed of the said motor.

9. In weighing apparatus, a pivotally mounted scale beam, a poise supported on said beam, means for automatically shifting said poise on the beam, including an electric motor and normally open controlling circuits therefor, contacts in said motor circuits, and contacts carried by said beam at opposite sides of and equidistant from the pivotal axis of the beam, the said beam carried contacts adapted to alternately engage the contacts of and close the motor circuits, respectively, upon positive and negative rotation of said beam.

10. In automatic weighing apparatus, a scale beam, a poise supported on said beam, means for shifting the poise, and normally open controlling circuits for said poise shifting means adapted to be closed by movements of said scale beam, the said controlling circuits having contact members therein, and contact members carried by the scale beam adapted to engage said controlling circuit contact members, respectively, to close the circuits, the said controlling circuit contact members and beam carried contacts relatively movable when in circuit closing engagement to prevent sticking.

Signed at Langley Field, Virginia, this 23d day of August, 1922.

FREDERICK H. NORTON.